US008511150B2

(12) United States Patent
Lucas et al.

(10) Patent No.: US 8,511,150 B2
(45) Date of Patent: Aug. 20, 2013

(54) METHODS AND SYSTEMS FOR DETERMINING PROCESS VARIABLES USING LOCATION OF CENTER OF GRAVITY

(75) Inventors: Bruce C. Lucas, Marlow, OK (US); Glenn H. Weightman, Duncan, OK (US); Rebecca McConnell, Lone Grove, OK (US); Steve Crain, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 535 days.

(21) Appl. No.: 12/635,009

(22) Filed: Dec. 10, 2009

(65) Prior Publication Data

US 2011/0138892 A1    Jun. 16, 2011

(51) Int. Cl.
*G01M 1/00* (2006.01)
(52) U.S. Cl.
USPC .......................................... 73/65.01; 702/169
(58) Field of Classification Search
USPC .................... 73/65.01; 702/169; 382/288
See application file for complete search history.

(56) References Cited

U.S. PATENT DOCUMENTS

| 1,730,173 | A |   | 10/1929 | Stearns ........................... 73/296 |
| 2,795,403 | A |   | 6/1957  | Mead ............................... 259/4 |
| 2,821,854 | A |   | 2/1958  | Franke ............................ 73/296 |
| 3,155,248 | A |   | 11/1964 | Haller ............................. 214/38 |
| 3,279,550 | A | * | 10/1966 | Kersten .......................... 177/136 |
| 3,291,234 | A |   | 12/1966 | Woodburn ...................... 177/136 |
| 3,381,943 | A |   | 5/1968  | Miller ............................ 259/148 |
| 3,547,291 | A |   | 12/1970 | Batterton et al. ............. 214/515 |
| 3,587,760 | A |   | 6/1971  | Othmar et al. |
| 3,591,147 | A |   | 7/1971  | Anderson et al. ............. 259/154 |
| 3,687,319 | A |   | 8/1972  | Adam et al. .................. 214/501 |
| 3,792,790 | A |   | 2/1974  | Brubaker ...................... 214/501 |
| 3,854,540 | A |   | 12/1974 | Holmstrom ................... 177/136 |
| 3,857,452 | A |   | 12/1974 | Hartman ....................... 177/139 |
| 3,893,655 | A |   | 7/1975  | Sandiford ......................... 259/4 |
| 3,931,999 | A |   | 1/1976  | McCain .......................... 302/14 |
| 3,934,739 | A |   | 1/1976  | Zumsteg et al. .............. 214/501 |

(Continued)

FOREIGN PATENT DOCUMENTS

| DE | 37 17 417 A1  | 12/1988 |
| DE | 295 18 215 U1 | 5/1996  |

(Continued)

OTHER PUBLICATIONS

Author: Fenna, Donald, Title: "Dictionary of Weights, Measures, and Units", Publisher: Oxford University Press, Date: 2002, pp. I, 65 and 66.*

(Continued)

*Primary Examiner* — Lisa Caputo
*Assistant Examiner* — Roger Hernandez-Prewitt
(74) *Attorney, Agent, or Firm* — John Wustenberg; Baker Botts L.L.P.

(57) ABSTRACT

Methods and systems for using force measurements to determine the amount of material in a container and/or the rate at which material is discharged from a container are disclosed. A container for storing a desired material is positioned so that the center of gravity of the container shifts horizontally with changes in level of the material in the container. A plurality of load sensors are symmetrically arranged at a base of the container and are used to monitor the amount of materials in the container.

24 Claims, 6 Drawing Sheets

(56) References Cited

U.S. PATENT DOCUMENTS

| | | | | |
|---|---|---|---|---|
| 4,063,605 | A | 12/1977 | Graham | 177/225 |
| 4,103,752 | A | 8/1978 | Schmidt | 177/141 |
| 4,163,626 | A | 8/1979 | Batterton et al. | 414/469 |
| 4,187,047 | A | 2/1980 | Squifflet | 414/332 |
| 4,249,838 | A | 2/1981 | Harvey et al. | 406/51 |
| 4,345,628 | A | 8/1982 | Campbell et al. | 141/83 |
| 4,345,872 | A | 8/1982 | Arnold | 414/705 |
| 4,411,327 | A | 10/1983 | Lockery et al. | 177/211 |
| 4,465,420 | A | 8/1984 | Dillman | 414/332 |
| 4,621,972 | A | 11/1986 | Grotte | 414/477 |
| 4,634,335 | A | 1/1987 | Van Den Pol | 414/494 |
| 4,708,569 | A | 11/1987 | Nijenhuis | 414/332 |
| 4,726,435 | A | 2/1988 | Kitagawa et al. | 177/187 |
| 4,739,494 | A | 4/1988 | Torii | 364/567 |
| 4,775,275 | A | 10/1988 | Perry | 414/21 |
| 4,819,750 | A | 4/1989 | Carnevale | 177/256 |
| 4,844,189 | A | 7/1989 | Shisgal et al. | 177/211 |
| 4,850,750 | A | 7/1989 | Cogbill et al. | |
| 4,913,198 | A | 4/1990 | Hayahara et al. | 141/83 |
| 5,044,861 | A | 9/1991 | Kirchhoff et al. | 414/332 |
| 5,127,450 | A | 7/1992 | Saatkamp | 141/9 |
| 5,133,212 | A | 7/1992 | Grills et al. | 73/296 |
| 5,161,628 | A | 11/1992 | Wirth | 171/137 |
| 5,205,370 | A | 4/1993 | Paul et al. | 177/256 |
| 5,333,695 | A | 8/1994 | Walter | 172/272 |
| 5,343,000 | A | 8/1994 | Griffen et al. | 177/145 |
| 5,452,615 | A | 9/1995 | Hilton | 73/862.043 |
| 5,452,954 | A | 9/1995 | Handke et al. | |
| 5,546,683 | A | 8/1996 | Clark | 37/468 |
| 5,578,798 | A | 11/1996 | Nuyts | 177/136 |
| 5,635,680 | A | 6/1997 | Dojan | 177/136 |
| 5,637,837 | A | 6/1997 | Merz et al. | 177/145 |
| 5,665,910 | A | 9/1997 | Knutson et al. | 73/200 |
| 5,717,167 | A | 2/1998 | Filing et al. | 177/136 |
| 5,752,768 | A * | 5/1998 | Assh | 366/3 |
| 5,764,522 | A | 6/1998 | Shalev | 700/240 |
| 5,811,737 | A | 9/1998 | Gaiski | 177/1 |
| 5,811,738 | A | 9/1998 | Boyovich et al. | 177/136 |
| 5,850,757 | A | 12/1998 | Wierenga | 73/296 |
| 5,880,410 | A | 3/1999 | Neuman | 177/187 |
| 5,884,232 | A | 3/1999 | Buder | 702/42 |
| 6,118,083 | A | 9/2000 | Boyovich et al. | 177/136 |
| 6,148,667 | A | 11/2000 | Johnson | 73/296 |
| 6,186,657 | B1 | 2/2001 | Fuchsbichler | 366/165.4 |
| 6,242,701 | B1 | 6/2001 | Breed et al. | 177/144 |
| 6,284,987 | B1 | 9/2001 | Al-Modiny | 177/170 |
| 6,313,414 | B1 | 11/2001 | Campbell | 177/16 |
| 6,384,349 | B1 | 5/2002 | Voll | 177/25.19 |
| 6,474,926 | B2 | 11/2002 | Weiss | 414/332 |
| 6,495,774 | B1 | 12/2002 | Pederson | 177/136 |
| 6,532,830 | B1 | 3/2003 | Jansen et al. | 73/862.042 |
| 6,601,763 | B1 | 8/2003 | Hoch et al. | 235/385 |
| 6,769,315 | B2 | 8/2004 | Stevenson et al. | 73/862.629 |
| 6,928,886 | B2 | 8/2005 | Meusel et al. | 73/862.324 |
| 6,948,535 | B2 | 9/2005 | Stegemoeller | 141/67 |
| 7,048,432 | B2 | 5/2006 | Phillippi et al. | 366/164.1 |
| 7,202,425 | B2 | 4/2007 | Knudsen et al. | 177/211 |
| 7,214,028 | B2 | 5/2007 | Boasso | 414/812 |
| 7,214,892 | B2 | 5/2007 | Williamson | 177/170 |
| 7,240,549 | B2 | 7/2007 | Kimbara et al. | 73/296 |
| 7,267,001 | B1 | 9/2007 | Stein | 73/296 |
| 7,353,875 | B2 | 4/2008 | Stephenson et al. | 166/305.1 |
| 7,528,329 | B2 | 5/2009 | Nuyts | 177/136 |
| 2001/0038018 | A1 | 11/2001 | Bell et al. | 222/58 |
| 2003/0047387 | A1 | 3/2003 | Bogat | 186/59 |
| 2003/0047603 | A1 | 3/2003 | Lustenberger et al. | 235/385 |
| 2003/0117890 | A1 | 6/2003 | Dearing et al. | |
| 2003/0202869 | A1 | 10/2003 | Posch | 414/498 |
| 2005/0110648 | A1 | 5/2005 | Lehrman et al. | 340/686.1 |
| 2006/0225924 | A1 | 10/2006 | Ivan et al. | 175/66 |
| 2007/0107540 | A1 * | 5/2007 | Davies | 73/866 |
| 2007/0125543 | A1 | 6/2007 | McNeel et al. | 166/308.3 |
| 2007/0201305 | A1 | 8/2007 | Heilman et al. | 366/141 |
| 2008/0066911 | A1 | 3/2008 | Luharuka et al. | 166/283 |
| 2008/0271927 | A1 | 11/2008 | Crain et al. | 177/1 |
| 2009/0090504 | A1 | 4/2009 | Weightman | |
| 2009/0107734 | A1 | 4/2009 | Lucas | 177/25.11 |

FOREIGN PATENT DOCUMENTS

| | | |
|---|---|---|
| DE | 295 18 215 U1 | 6/1996 |
| DE | 10 2004 021832 A1 | 12/2005 |
| DE | 102004021832 A1 | 12/2005 |
| EP | 0 218 466 A1 | 4/1987 |
| EP | 0218466 A1 | 4/1987 |
| EP | A 0 605 113 A1 | 7/1994 |
| FR | 2474335 | 7/1981 |
| WO | WO88/06720 A1 | 9/1988 |
| WO | WO 88/06720 A1 | 9/1988 |
| WO | WO 94/19263 | 9/1994 |
| WO | WO 2007/113528 A1 | 10/2007 |
| WO | WO 2009/065858 | 5/2009 |

OTHER PUBLICATIONS

Editor: Kutz, Myer, Title: "Mechanical Engineers' Handbook", Publisher: John Wiley & Sons, Inc., Edition: Second, Date: 1998, pp. I, II and 1332.*
Author: Abulnaga, Baha E., P.E., Title: "Slurry Systems Handbook", Publisher: McGraw-Hill, Date: 2002, pp. I, II and 1.20.*
Machine translation of DE 102004021832 to Heiko Soon et al., Title: Level measuring system for a motor vehicle with a fuel tank attached to bearing points of the motor vehicle, Date: Jan. 12, 2005.*
Office Action issued in U.S. Appl. No. 12/235,270, Mar. 4, 2011.
Office Action in U.S. Appl. No. 11/741,509, Jan. 28, 2010.
Office Action in U.S. Appl. No. 11/930,756, Jan. 28, 2010.
Advisory Action in U.S. Appl. No. 11/930,756, Mar. 31, 2010.
International Search Report in PCT/GB2010/002256, Apr. 1, 2011.
International Search Report in PCT/GB2010/001717, May 10, 2011.
Office Action in U.S. Appl. No. 12/182,297, Apr. 21, 2011.
Office Action in U.S. Appl. No. 12/422,450, Jun. 18, 2010.
Office Action in U.S. Appl. No. 12/435,551, Jun. 15, 2011.
Office Action from U.S. Appl. No. 11/930,756, dated May 27, 2010.
International Search Report for Application No. PCT/GB2010/000512, Jun. 25, 2010.
Office Action in U.S. Appl. No. 11/930,756, Mar. 18, 2009.
Office Action in U.S. Appl. No. 11/930,756, Jul. 7, 2009.
Office Action in U.S. Appl. No. 11/741,509, Aug. 19, 2009.
International Search Report in PCT/GB2010/002256, Jun. 21, 2012.
International Preliminary Report on Patentability in PCT/GB2009/001675 issues Feb. 1, 2011.
Office Action issued in Canadian Application No. 2,731,840 on Jul. 25, 2012.

* cited by examiner

METHODS AND SYSTEMS FOR DETERMINING PROCESS VARIABLES USING LOCATION OF CENTER OF GRAVITY

BACKGROUND

The present invention relates generally to monitoring materials in a container, and more particularly, to methods and systems for using force measurements to determine the amount of materials in a container and/or the rate at which materials are discharged from a container.

Materials that are used in industrial operations are often stored in containers before being mixed together to create a desired mixture. For instance, storage containers are frequently used in industries such as agriculture, pharmaceuticals and oil field applications. In oil field operations, fluids are often stored in containers before being discharged into a blender or being pumped down hole.

It is often desirable to monitor the amount of materials stored in a container. Additionally, in instances where material is being discharged from a container, it is desirable to monitor the rate at which material is being discharged. However, the materials used are often hazardous or not environmentally friendly, making their exposure undesirable. Moreover, space is often limited, giving rise to a need for a material monitoring system and method with minimal space and equipment requirements.

FIGURES

Some specific example embodiments of the disclosure may be understood by referring, in part, to the following description and the accompanying drawings.

Figure 1:
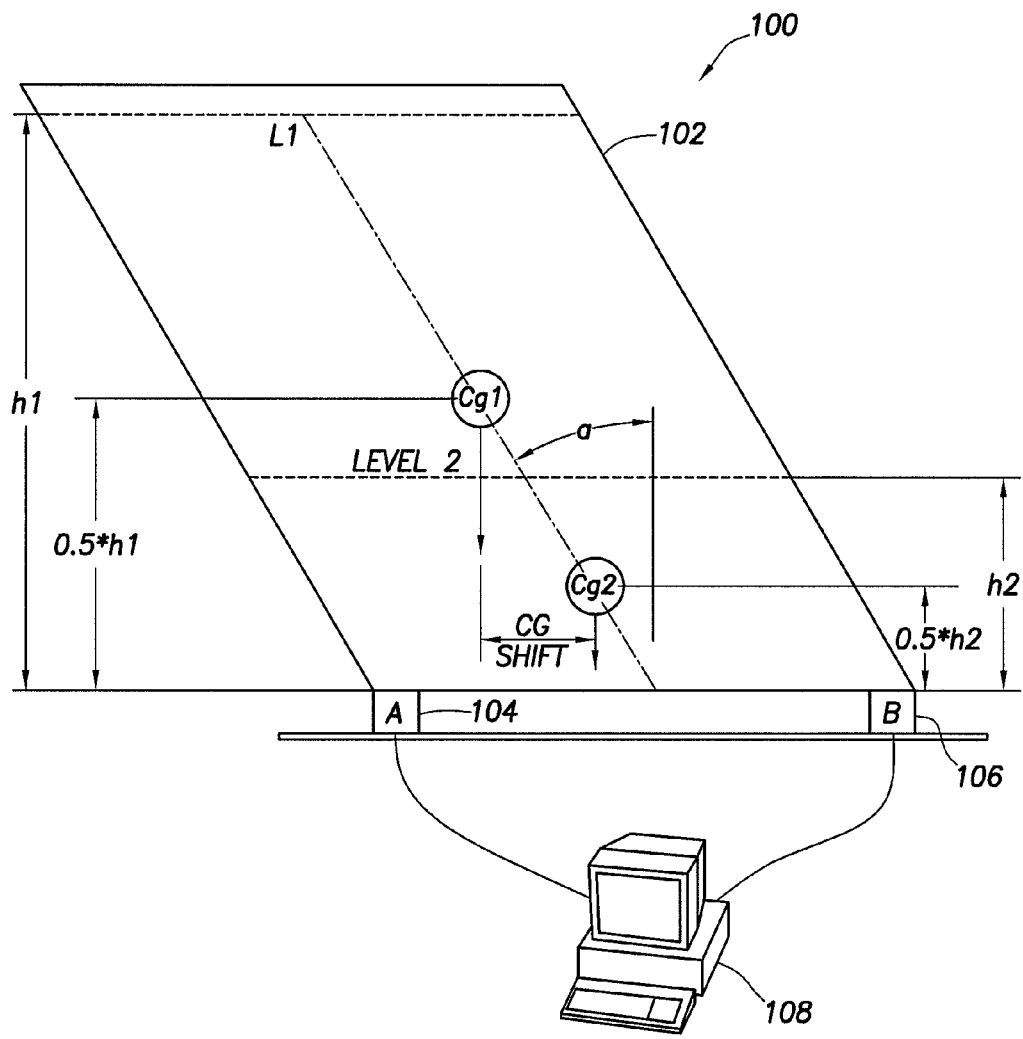
FIG. 1 is a cross-sectional view of the side of a material storage and delivery system in accordance with an exemplary embodiment of the present invention.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention relates generally to monitoring materials in a container, and more particularly, to methods and systems for using force measurements to determine the amount of materials in a container and/or the rate at which materials are discharged from a container.

In one exemplary embodiment, the present invention is directed to a method of monitoring materials in a container comprising the steps of: placing the container in a desired position; wherein when the container is placed in the desired position, a change in level of materials in the container changes position of center of gravity of the materials in the container along the horizontal axis; determining the location of center of gravity of the materials in the container; and determining level of materials in the container; wherein the level of materials in the container is determined using position of the center of gravity of the materials in the container and container geometry.

In another exemplary embodiment, the present invention is directed to a method of monitoring materials in a container comprising: placing the container at an angle to vertical; wherein the container rests on a first load sensor and a second load sensor; wherein the first load sensor and the second load sensor are separated by a predetermined distance; determining the mass of the materials in the container using the readings of the first load sensor and the second load sensor; determining the location of center of gravity of the container using a ratio of force at the first load sensor and force at the second load sensor; determining level of materials in the container using the location of the center of gravity and the angle of the container from vertical; and determining the volume of materials in the container using the level of materials in the container and container geometry.

In yet another exemplary embodiment, the present invention is directed to a method of monitoring the amount of materials in a container comprising: placing the container on an angled platform resting on a first load sensor and a second load sensor; wherein the first load sensor and the second load sensor are separated by a predetermined distance; locating center of gravity of the container at a first point in time; changing the amount of materials in the container; locating center of gravity of the container at a second point in time; determining the change in the level of materials in the container between the first point in time and the second point in time; and determining the volume of materials removed from the container.

In another exemplary embodiment, the present invention is directed to a system for monitoring material storage comprising: a container for storing a material; wherein center of gravity of the container shifts horizontally with changes in level of the material in the container; and a plurality of load sensors coupled to the container; wherein the plurality of load sensors are symmetrically arranged at a base of the container.

In another exemplary embodiment, the present invention is directed to a method of monitoring materials in a container comprising: placing the container on a first load sensor and a second load sensor; wherein the container is positioned at an angle to vertical; determining a relationship between readings of force at the first load sensor and the second load sensor and level of materials in the container; placing a desirable material in the container; monitoring amount of the desirable material in the container using the readings of force at the first load sensor and the second load sensor.

The features and advantages of the present disclosure will be readily apparent to those skilled in the art upon a reading of the description of exemplary embodiments, which follows.

DESCRIPTION

The present invention relates generally to monitoring materials in a container, and more particularly, to methods and systems for using force measurements to determine the amount of material in a container and/or the rate at which material is discharged from a container.

Turning now to FIG. 1, a storage unit adapted for use in accordance with an exemplary embodiment of the present invention is denoted generally with reference numeral 100. The storage unit 100 includes a storage container 102 resting on two load sensors A 104 and B 106 and tilted at an angle "a" relative to the vertical. As would be appreciated by those of ordinary skill in the art, with the benefit of this disclosure, the angle "a" may be measured using an incline sensor. Moreover, as would be appreciated by those of ordinary skill in the art, with the benefit of this disclosure, although the exemplary embodiment uses two load sensors, more than two load sensors may be arranged symmetrically at the base of the storage container 102 and used in conjunction with the methods disclosed herein.

In one exemplary embodiment, load cells may be used as load sensors. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual shear beam load cells, strain gauges and pressure transducers. Standard load cells are available in various ranges such as 0-5000 pounds, 0-10000 pounds, etc.

In one exemplary embodiment, the load sensors 104, 106 may be communicatively coupled to an information handling system 108 which may display and process the load sensor readings. Although FIG. 1 depicts a personal computer as the information handling system 108, as would be apparent to those of ordinary skill in the art, with the benefit of this disclosure, the information handling system 108 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 108 may be a network storage device, or any other suitable device and may vary in size, shape, performance, functionality, and price.

For instance, in one exemplary embodiment, the information handling system 108 may be used to monitor the amount of materials in the storage container 102 over time and/or alert a user when the contents of a storage unit 102 reaches a threshold level. The user may designate a desired sampling interval at which the information handling system 108 may take a reading of the load sensors 104, 106. The information handling system 108 may then compare the load sensor readings to the threshold value to determine if the threshold value is reached. If the threshold value is reached, the information handling system 108 may alert the user. In one embodiment, the information handling system 108 may provide a real-time visual depiction of the amount of materials contained in the storage container 102. Moreover, as would be appreciated by those of ordinary skill in the art, with the benefit of this disclosure, the load sensors 104, 106 may be coupled to the information handling system 108 through a wired or wireless (not shown) connection.

In this exemplary embodiment, when the container is filled with a homogeneous material to a level L1 at height h1, the center of gravity of the contained material is located at half the height of the material volume at cg1, as shown in FIG. 1.

As would be appreciated by those of ordinary skill in the art, with the benefit of this disclosure, the center of gravity of a system is at the same location as the center of mass of that system, and the two terms are used interchangeably throughout the specification. As the amount of materials in the storage container 102 decreases, the center of gravity of the material shifts down and to the right. For instance, as shown in FIG. 1, at a second point in time, when the level of the materials in the storage container 102 reaches a second level, L2, at height h2, the center of gravity of the contained material may be located at half the height of the material volume at cg2.

The shift in the center of gravity (CG) is sensed with the load sensors A 104 and B 106 by subtracting the relative tare force of the container and any external forces from each value, then evaluating the ratio of the relative forces A' at the load sensor A 104 and B' at the load sensor B 106. The material level can be determined from the ratio of the relative force A' to relative force B' for any known geometry.

For Container shown in FIG. 1, assume that A is located at X=0, B is located at X=L, and the tare weight of the container, frame, piping and other non-fluid forces has been subtracted from A and B to provide fluid forces N and B'. The x coordinate of the center of gravity for the fluid (Cgx) may then be found by the following equation:

$$Cgx = B'*L/(A'+B')$$ [Equation 1]

Accordingly, Cgx is a function of A', B' and L or Cgx=F(A', B',L). Similarly, for any tank geometry where the location of the center of gravity of the fluid volume (Cgx) varies with fluid height (H) or H=F(Cgx), H may be found. For the Tank in FIG. 1, H may be found using the following equation:

$$H = 2*((L/2 - Cgx)/\tan a)$$ [Equation 2]

This ratio is independent of material density for any homogenous material and may be used as a tank level indicator. Similarly, the ratio is independent of any external forces that remain consistent with time including, but not limited to, ancillary piping forces, material momentum forces, etc. As with the container of FIG. 1, other tank geometries where the fluid height (H) is a function of center of gravity of the fluid (Cgx) will provide similar results.

Since the geometry of the container is known and the height of the material is found from the ratio of A' to B', the volume of the material in the container may be directly calculated. For instance, in the exemplary embodiment, assuming that h2 is the height of the material at a point in time t2, the volume of materials in the container may be determined by multiplying the horizontal cross sectional area of the container by h2.

Similarly, once A' and B' are known for a given point in time, the total weight of the material in the container may be determined using the following equation:

$$W_{material} = (A' + B')$$ [Equation 3]

where $W_{material}$ is the weight of the material in the storage container 102. Once the weight of the material in the storage container 102 is determined, the mass of the material may be obtained by dividing the weight of the material by the gravitational constant, g. Finally, once the volume and mass of the material in the storage container 102 are known, the density of the material may be determined by dividing the mass of the material by its volume.

In one exemplary embodiment, the relative forces A' and B' at the load sensors A 104 and B 106 may be monitored over time and used to monitor the change in the mass and/or volume of the material in the storage container 102 in real time. The change in mass and/or volume of the material over time may then be used to determine the mass and/or volumetric flow rate of the material from the storage container 102.

In one exemplary embodiment, the storage container 102 may be constructed such that its contents may be subjected to special conditions for measurements at different desired temperatures, pressures or other special conditions.

Figure 2:
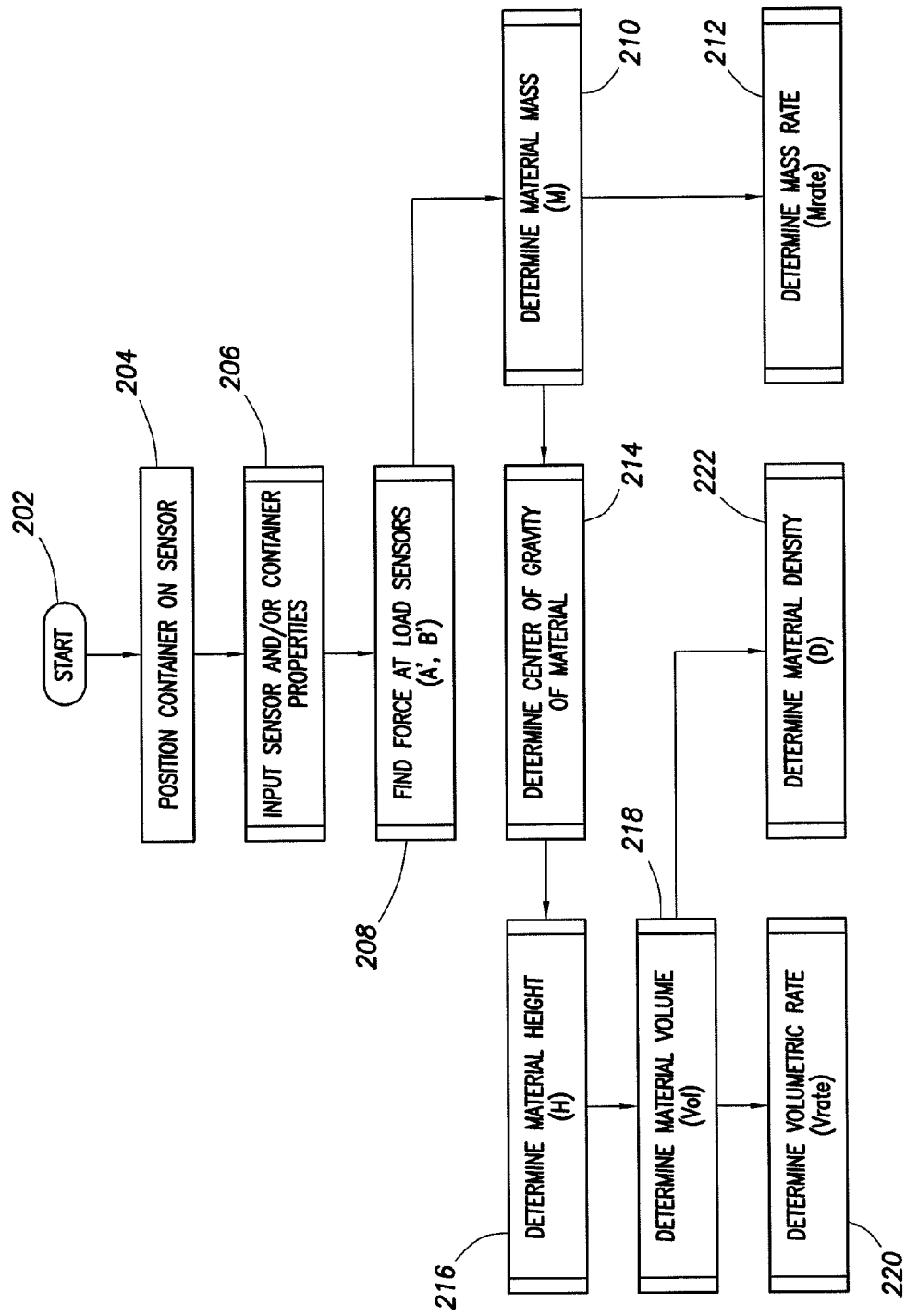
FIG. 2 is a flow diagram of the overall process for determining process variables in accordance with an exemplary embodiment of the present invention.

FIG. 2 is a flow diagram for an overall process for determining material properties for materials stored in a storage container. The process starts at step 202. At step 204, the storage container is placed on a platform which may be coupled to one or more load sensors. As would be appreciated by those of ordinary skill in the art, with the benefit of this disclosure, in one embodiment the storage container may be directly placed on the load sensors. The materials to be analyzed may be placed inside the storage container before it is placed on the load sensors or may be added after the storage container is placed on the load sensor. Next, at step 206, the user may provide the sensor and/or container properties as an input to the system. The container properties may include information about the shape and dimensions of the container and sensor properties may include the predetermined distance between the force sensors and the response of the sensor(s) to a specific input (force or incline), which may include range, offset, and linearity corrections for the sensor(s).

Next, at step 208, the relative force at each load sensor is determined. Specifically, with respect to the exemplary storage unit depicted in FIG. 1, the shift in the center of gravity is sensed with the load sensors A 104 and B 106 by subtracting the relative tare force of the container and any external forces from each value, then evaluating the ratio of the relative forces A' at the load sensor A 104 and B' at the load sensor B 106. This ratio is independent of material density for any homogenous material and may be used as a tank level indicator. Similarly, the ratio is independent of any external forces that remain consistent with time including, but not limited to, ancillary piping forces, material momentum forces, etc. These external forces can be determined for a particular container by calculations or by actual measurements from an empty container. Moreover, the relationship of the force ratios or center of gravity (CG) to fluid level for a particular container can be determined by filling the empty container with fluid of a known density while recording the outputs. This enables application of this method for containers of complex shapes without performing complete mathematical derivations. This technique is also beneficial for containers that typically deform in a consistent manner under load.

As with the container of FIG. 1, other tank geometries where the fluid height (H) is a function of center of gravity of the fluid (CGx) will provide similar results.

At a first point in time, t1, the total weight of the material in the storage container may be determined as:

$$W_{material} = A' + B' - W_{storage\ container} \quad [\text{Equation 4}]$$

where $W_{material}$ is the weight of the material in the container at t1, A' is the force at load sensor A 104, B' is the force at the load sensor B 106 and $W_{storage\ container}$ is the weight of the empty storage container. Once the weight of the material in the storage container 102 is determined, the mass of the material may be obtained at step 210 by dividing the weight of the material by the gravitational constant, g. In on exemplary embodiment, the relative forces A' and B' at the load sensors A 104 and B 106 may be monitored at step 212 over time and used to monitor the change in the mass of the material in the storage container 102 in real time. The change in mass of the material over time may then be used to determine the mass flow rate of the material from the storage container 102.

Once the mass and the relative force at the load sensors is known, in one exemplary embodiment, the center of gravity of the material in the container is determined at step 214. With reference to the exemplary embodiment referenced in FIG. 1, when the container is filled with a homogeneous material to a level L1 at height h1, the center of gravity of the contained material is located at half the height of the material volume at cg1, as shown in FIG. 1. As the amount of materials in the storage container 102 decreases, the center of gravity of the material shifts down and to the right. For instance, as shown in FIG. 1, at a second point in time, when the level of the materials in the storage container 102 reaches a level L2 at height h2, the center of gravity of the contained material may be located at half the height of the material volume at cg2. The lateral movement of the center of gravity affects the reading of the load sensors A 104 and B 106. Accordingly, the location of the center of gravity may be determined at any point in time based on the relative forces A' and B' at the load sensors A 104 and B 106. Therefore, the location of the center of gravity may be defined as a function of the relative force at each of the load sensors that the container rests on.

For example, with reference to the exemplary storage unit 100 depicted in FIG. 1, load sensor A 104 is located at X=0 and load sensor B 106 is located at X=L. For this exemplary embodiment, the following equation may be used to define the location of the center of gravity of the stored material in the X direction as a function of the reading of the load cells A 104 and B 106:

$$CGx = (Bx - Ax) \times \left[\frac{Bf}{Wf}\right] \quad [\text{Equation 5}]$$

where CGx is the location of the center of gravity of the stored material in the X direction; Bx is the X coordinate of the load cell B 106; Ax is the X coordinate of the load cell A 104, Bf is the contribution of the stored material to the reading B' at load cell B 106 and Wf is the total weight of the stored material in the container.

As would be appreciated by those of ordinary skill in the art, with the benefit of this disclosure, a similar method may be used for any other storage container where the center of gravity moves laterally with changes in the level of the material contained therein. Moreover, as would be appreciated by those of ordinary skill in the art, with the benefit of this disclosure, a different number and orientation of the load sensors may be used in accordance with this disclosure to achieve different degrees of accuracy and/or analyze storage containers having different cross-sectional shapes.

Next, at step 216, the height of the material in the container may be determined based on the location of the center of gravity. As would be appreciated by those of ordinary skill in the art, with the benefit of this disclosure, the material height can be determined from the ratio of the relative force A' to relative force B' for any known geometry.

For example, with reference to the exemplary storage unit 100 of FIG. 1, the height of the material contained in the container may be determined as a function of the location of the center of gravity of the stored material in the X direction using the following equation:

$$Hm = \frac{\left[CGx - \frac{(Bx - Ax)}{2}\right]}{\left[\frac{\tan(\alpha)}{2}\right]} \quad [\text{Equation 6}]$$

where Hm is the height of the material in the container and $\alpha$ is the angle at which the container is sloped from the vertical.

As would be appreciated by those of ordinary skill in the art, with the benefit of this disclosure, the equation above may be modified for different storage container shapes or a different number of load sensors, in order to determine the height of the stored material as a function of the location of the center of gravity.

Since the geometry of the container is known and the height of the material is found from the ratio of A' to B', the volume of the material in the container may be directly calculated at step 218. For instance, in the exemplary storage unit 100 of FIG. 1, assuming that Hm is the height of the material at a point in time t2, the volume of materials in the container may be determined using the horizontal cross-sectional area of the storage container 102 and the height (Hm).

In one exemplary embodiment, the relative forces A' and B' at the load sensors A 104 and B 106 may be monitored over time and used to monitor the change in the volume of the materials in the storage container 102 in real time. The change in volume of the materials over time may then be used to determine volumetric flow rate of the materials from the storage container 102.

Finally, once the volume of the material in the storage container is determined at step 218 and the mass is determined at step 210, at step 222 the density of the material may be determined by dividing the mass of the material by its volume. As would be appreciated by those of ordinary skill in the art, with the benefit of this disclosure, in another exemplary embodiment the change in volume ($\Delta V$) obtained at step 220 and the change in mass ($\Delta M$) obtained at step 212 may be used to determine the density of the material removed ($\rho_{material\ removed}$) using the following equation:

$$\rho_{material\ removed} = (\Delta M)/(\Delta V) \qquad \text{[Equation 7]}$$

Because the material is a homogenous material, the density of the material remaining ($\rho_{material}$) in the storage container 302 is the same as the density of the materials removed ($\rho_{material\ removed}$).

Figure 3:
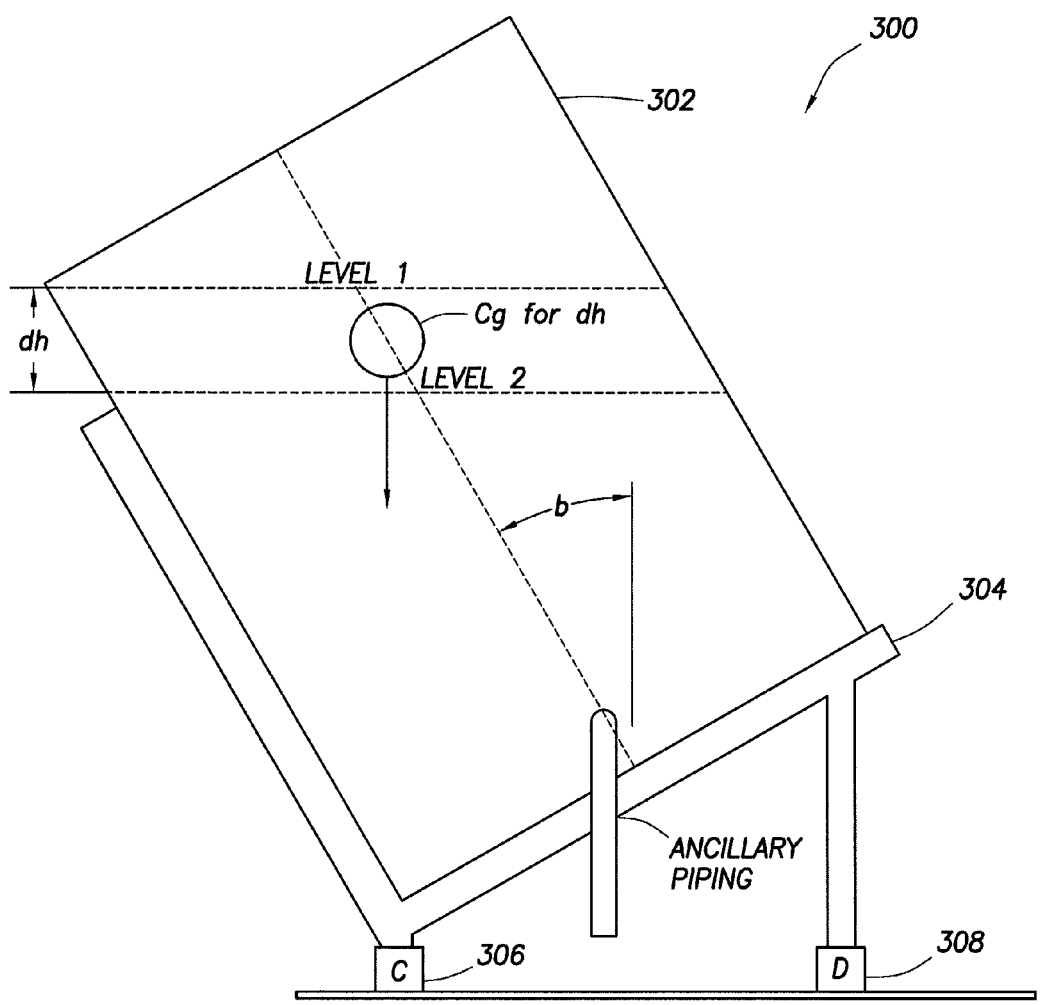
FIG. 3 is a cross-sectional view of the side of a material storage and delivery system in accordance with an exemplary embodiment of the present invention.

In another exemplary embodiment, the storage container may have a symmetrical shape such that the center of gravity does not shift laterally with a change in the level of materials in the container when the container is placed on a plane surface. For instance, in one embodiment, the system disclosed herein may include a storage container which is cubical as depicted generally with reference numeral 300 in FIG. 3. In this exemplary embodiment, the storage container 302 may be placed on a support structure 304 with load sensors C 306 and D 308 at its base. As depicted in FIG. 3, the support structure maintains the storage container 302 at an angle b from the vertical so that the center of gravity of the container changes with changes in the level of materials in the storage container 302. The container may then be monitored and analyzed in accordance with the process steps set forth in the flow diagram in FIG. 2 and discussed above.

Specifically, at a first point in time, t1, the total weight of the material in the tank is determined as:

$$W_{material} = F_C + F_D - W_{storage\ container} \qquad \text{[Equation 8]}$$

where $W_{material}$ is the weight of the material in the container at t1, $F_C$ is the force at load sensor C 306, $F_D$ is the force at the load sensor D 308 and $W_{storage\ container}$ is the weight of the empty storage container. Once the weight of the material is determined, the mass of the material ($M_{material}$) at time t1 may be determined as:

$$M_{material} = W_{material}/g \qquad \text{[Equation 9]}$$

where g is the gravitational constant. The ratio of the forces $F_C$ and $F_D$ at the load sensor C 206 and D 208 may then be used to determine the location of the center of gravity cg1 at time, t1:

$$cg1 = Fd*L/(Fc+Fd) \qquad \text{[Equation 10]}$$

As material is added to or removed from the storage container 302 over time, at a second point in time, t2, the ratio of the forces $F_C$ and $F_D$ at the load sensor C 306 and D 308 may be used to determine the location of the center of gravity cg2 using the equations above. The shift in the location of the center of gravity between t1 and t2 may be used to determine the change in the height of the material contained in the storage container 302 using the equation:

$$\Delta H = 2*(cg2-cg1)/\tan(b) \qquad \text{[Equation 11]}$$

Using the storage container 302 geometry and the change in the height of the material in the storage container 302, the volume ($\Delta V$) of the material added to or removed from the storage container 302 may be determined. The change in the mass ($\Delta M$) of the material contained in the storage container between the first point in time t1 and the second point in time t2 may also be determined using the readings of load sensors C 306 and D 308 at t1 and t2.

Figure 4:
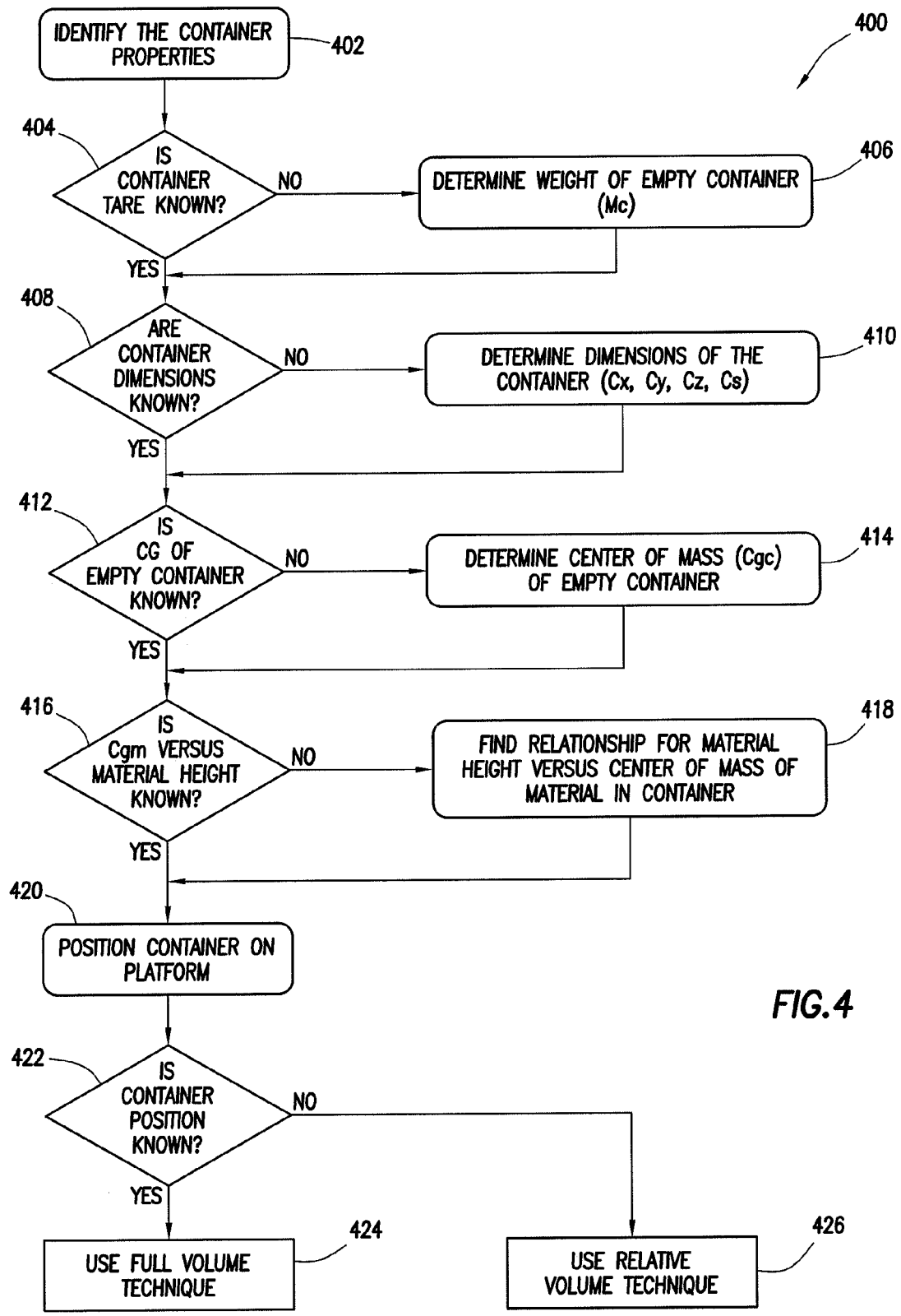
FIG. 4 is a flow diagram of a method for determining material properties in accordance with an exemplary embodiment of the present invention.

Depicted in FIG. 4 is a flow diagram of a method for determining material properties in accordance with another exemplary embodiment of the present invention denoted generally with reference numeral 400. First, at step 402, the properties of the storage container being analyzed are identified. These properties may include information regarding the shape and dimensions of the container. Next, at step 404, it is determined whether the container tare is known. If not, then at step 406 the weight of the empty container is determined. As would be appreciated by those of ordinary skill in the art, the weight of the empty container may be determined, for example, by simply placing the empty container on one or more load sensors. Once the container tare is known, the process proceeds to step 408 to determine if the container dimensions are known. If not, at step 410 the container dimensions are determined. This process may include determining the dimensions of the container in the X, Y, Z and S directions.

Next, at step 412 it is determined whether the center of gravity of the empty container is known. If so, the process proceeds to step 416. If not, the center of gravity of the empty container is determined at step 414. As would be appreciated by those of ordinary skill in the art, the location of the center of gravity is dependent on the shape of the container. Specifically, the center of gravity, R, of a system of particles is defined as the average of their position, $r_i$, weighted by their masses, $m_i$:

$$R = \frac{\sum m_i r_i}{\sum m_i} \qquad \text{[Equation 12]}$$

Once the center of gravity of the empty container is determined, at step 416 it is determined whether the relationship between the center of gravity of the container when it contains materials and the height of the materials is known. If this relationship is known, the process proceeds to step 420. If not, the height of the materials in the container is defined as a function of the center of gravity of the material in the container at step 418. As discussed in more detail above, the relationship for the exemplary embodiment of FIG. 1 is defined by Equation 6. As would be appreciated by those of ordinary skill in the art, with the benefit of this disclosure, a similar relationship may be defined for other geometries of the storage container.

Next, at step 420, the container is positioned on the platform used for monitoring the material properties. In one exemplary embodiment, as depicted in FIG. 1, the platform may include two load cells A 104 and B 106. Once the container is on the platform, it is determined at step 422 whether the container position relative to the force sensors is known. Using the location of the container relative to the force sensors, the position of the center of gravity of the empty container relative to the sensors may be established. Relative changes in height may then be identified and used to find the fill volume to establish the initial height. If the position is known, the process proceeds to step 424 and the "Full Volume Technique" is utilized to determine material properties. In contrast, if the container position is not known, the process proceeds to step 426 and the "Relative Volume Technique" is utilized.

Figure 5:
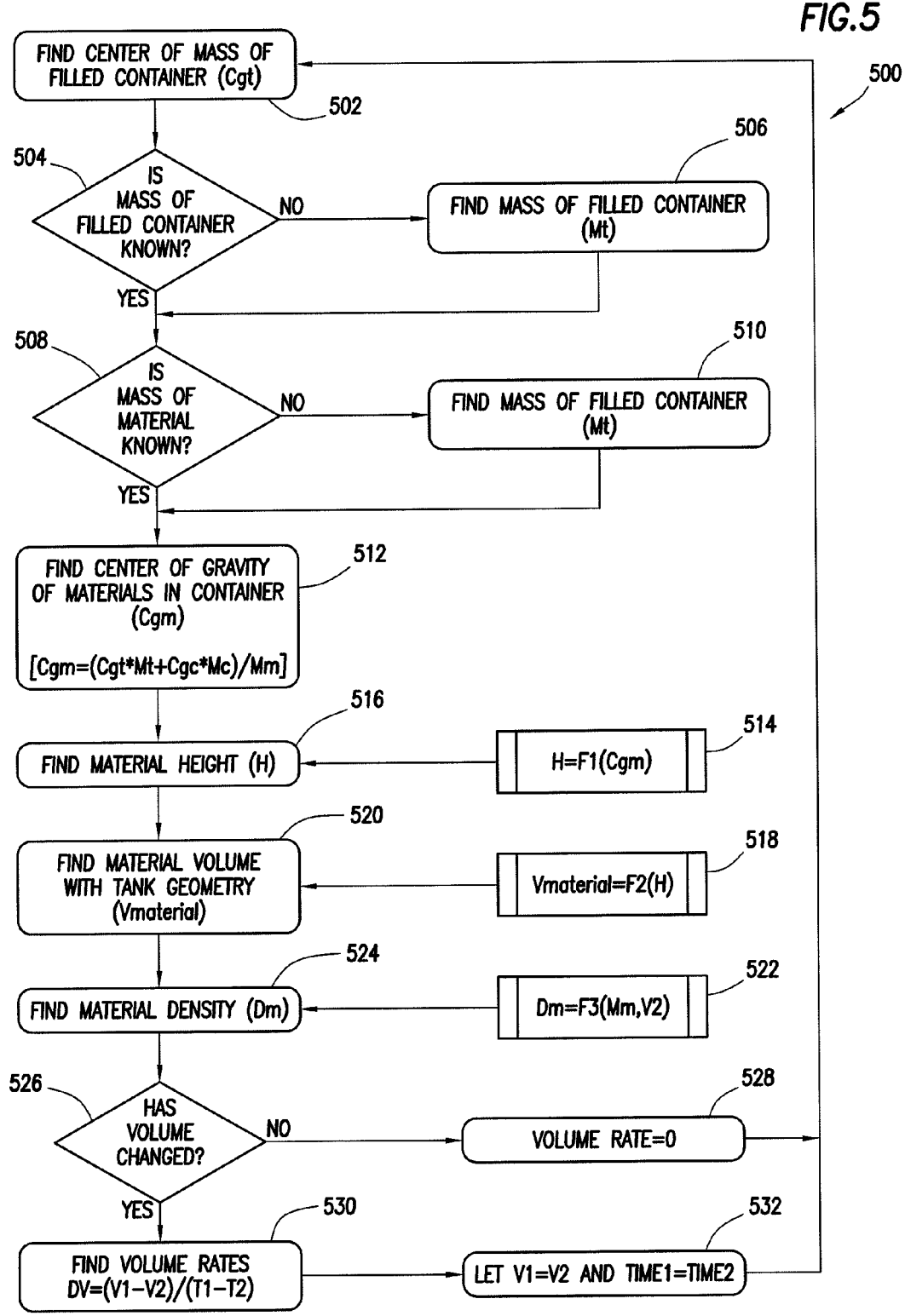
FIG. 5 is a flow diagram of the steps involved in the Full Volume Technique for determining material properties in accordance with an exemplary embodiment of the present invention.

FIG. 5 is a flow diagram of the steps involved in the Full Volume Technique referred to at step 424 in FIG. 4, in accordance with an exemplary embodiment of the present invention. First, at step 502, the location of the center of mass of the filled container ($CG_{filled}$) is determined. As would be appreciated by those of ordinary skill in the art, with the benefit of this his disclosure, the center of gravity of the filled container may be determined using Equation 12. Next, at step 504 it is determined whether the mass of the filled container ($M_{filled}$) is known. If the mass of the filled container is known, the process proceeds to step 508. If not, at step 506 the mass of the filled container is determined based on the readings from the load sensors on which the container rests. At step 508 it is determined whether the mass of the material in the container is known. If so, the process proceeds to step 512. If not, then the mass of the material in the container is determined at step 510. With the mass of the empty container ($M_c$) known from step 406 and the mass of the filled container ($M_{filled}$) known step 506, the mass of the material in the container may be calculated using the following equation:

$$M_{material} = M_{filled} - M_c \quad \text{[Equation 13]}$$

Once the mass of the material in the container is known, the location of the center of gravity of the materials in the container is determined using the following equation:

$$Cg_{material} = [(Cg_{filled} \times M_{filled}) - (CD_c \times M_c)] / M_{material} \quad \text{[Equation 14]}$$

As discussed in detail with reference to FIG. 2 above, the height of the material in the storage container may be defined as a function of the location of the center of gravity depending on the shape of the storage container and the number and location of the load sensors. Equation 6 shows this relationship for the exemplary embodiment of FIG. 1. Similarly, depending on the shape of the container used and the number and location of the load sensors, the height of the material in the storage container may be defined as a function of the location of the center of gravity at 514 and provided to the system at step 516. Accordingly, at step 516, the location of the center of gravity from step 512 and the relationship between the height of the material in the storage container and the center of gravity of the material from 514 are used to determine the height of the material in the storage container.

As would be appreciated by those of ordinary skill in the art, the volume of the material in the storage unit may be defined as a function of the height of the material in the storage unit. Specifically, for any storage container, the volume of the material in the storage container ($V_{material}$) may be determined using the horizontal cross-sectional area of the storage container integrated over the height of the material contained therein. This function is defined at 518 and provided to the system at step 520. Accordingly, at step 520, using the height of the material in the container from step 516 and the function defining the relationship between the height of the material and volume of the material, from step 518, the volume of material in the storage container is determined.

As would be appreciated by those of ordinary skill in the art, with the benefit of this disclosure, the density of the material in the storage container is equal to the mass of the material in the storage container divided by the volume of the material in the storage container. This function is defined at 522 and provided to the system at step 524. Accordingly, at step 524, the mass of the material in the storage container from step 510 is divided by the volume of the material in the storage container from step 520 to determine the density of the material in the storage container.

In accordance with an exemplary embodiment of the present invention, the volume of the material in the storage container may be determined at a first point in time, t1, ($V_{material1}$) and a second point in time, t2, ($V_{material2}$). In this embodiment, at step 526 it is determined whether there has been a change in the volume of the material in the storage container. If there has not been a change in volume, the system indicates that the rate of change of volume is zero at step 528 and the process returns to step 502. If there is a change in volume, the rate of change of volume (Dv) is determined at step 530 using the following equation:

$$Dv = \frac{[Vmaterial2 - Vmaterial1]}{t2 - t1} \quad \text{[Equation 15]}$$

Next, at step 532, ($V_{material1}$) is replaced with ($V_{material2}$) and t1 is replaced with t2 and the process returns to step 502 in order to carry out another iteration.

Figure 6:
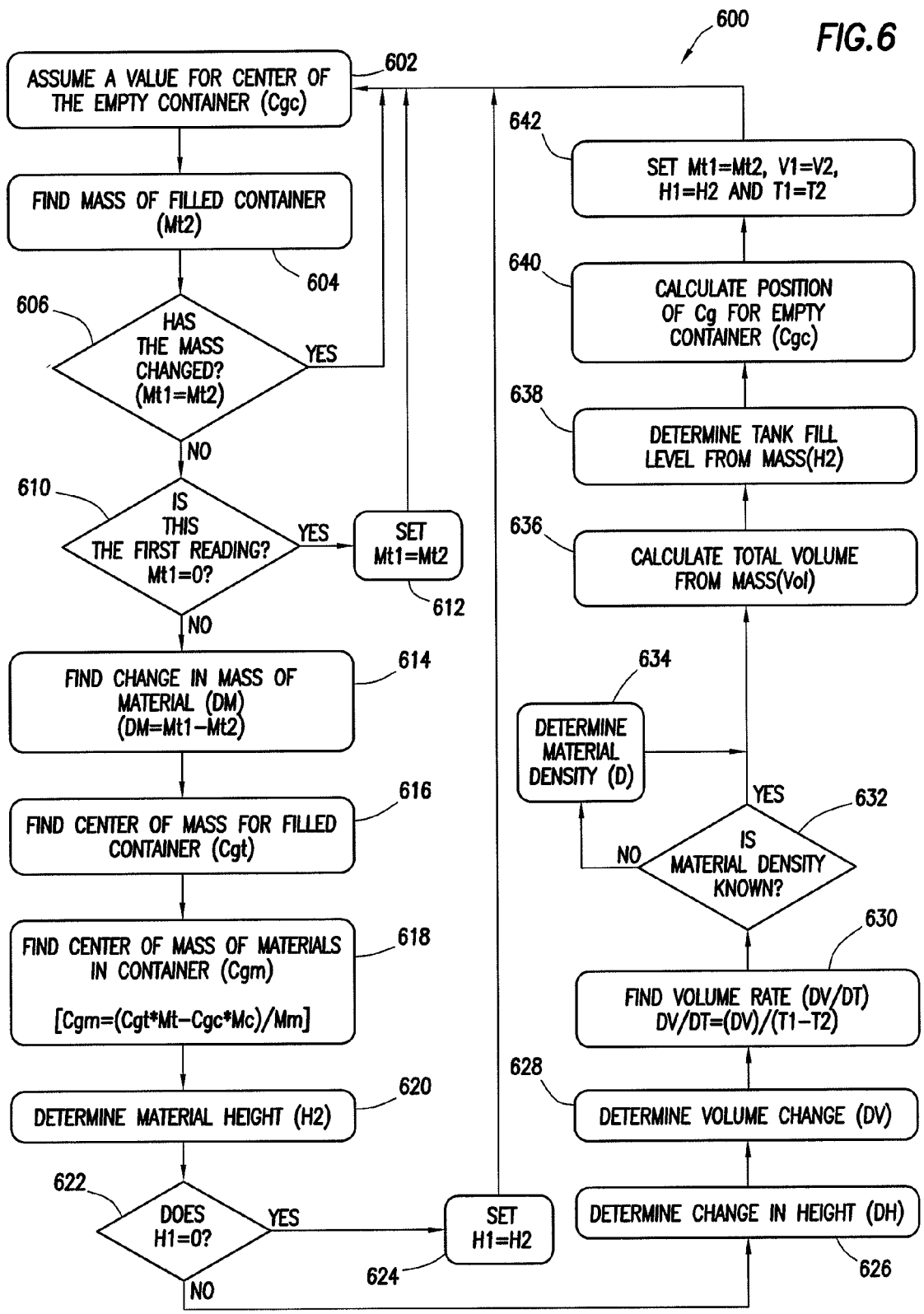
FIG. 6 is a flow diagram of the steps involved in the Relative Volume Technique for determining material properties in accordance with an exemplary embodiment of the present invention.

FIG. 6 is a flow diagram of the steps involved in the Relative Volume Technique referred to at step 426 in FIG. 4, in accordance with an exemplary embodiment of the present invention. First, at step 602, the center of mass of the empty container (CGc) is designated an assumed location. Next, at a time t1, the mass of the filled container ($M_{filled1}$) is determined at step 604 using the readings of the load sensors on which the container rests and gravitational constant, g. At step 606 it is determined whether the value obtained is the first measurement of the mass of the filled container. If this was the first reading, the process returns to step 604 where at time t2, the mass of the filled container ($M_{filled2}$) is again measured. Once the second measurement is taken, the process moves to step 608 where it is determined whether the first mass value ($M_{filled1}$) and the second mass value ($M_{filled2}$) are the same. If the two are the same, the process returns to step 604, where a new point in time is assigned as t2 and a new measurement for ($M_{filled2}$) is obtained. This process continues until ($M_{filled1}$) and ($M_{filled2}$) are no longer the same.

Once $M_{filled1}$ and $M_{filled2}$ are no longer the same, the process continues to step 610 where it is determined whether the mass of the filled container at time t1 ($M_{filled1}$) is equal to zero. If so, at step 612, the value of the mass of the filled container at time t2 ($M_{filled2}$) is designated as the value at t1 and the process repeats to obtain a new value for the mass at a time t2 which is different from the value at time t1. Once $M_{filled1}$ is not the same as $M_{filled2}$ and $M_{filled1}$ is not equal to zero, the process proceeds to step 614.

At step 614, the change in the mass of the materials between the first point in time and the second point in time is determined using the equation:

$$D_M = M_{filled1} - M_{filled2}$$ [Equation 16]

Next, at step 616, the center of gravity for the filled container is determined. As would be appreciated by those of ordinary skill in the art, with the benefit of this disclosure, the center of gravity of the filled container may be determined using Equation 12.

Next, the center of gravity of the materials in the container may be determined at step 618 using Equation 14. Once the center of gravity of the materials in the storage container is determined at step 618, at step 620, the height of the materials in the storage container is determined. As discussed in detail with reference to FIG. 2 above, the height of the material in the storage container may be defined as a function of the location of the center of gravity depending on the shape of the storage container and the number and location of the load sensors. Equation 6 shows this relationship for the exemplary embodiment of FIG. 1. Similarly, depending on the shape of the container used and the number and location of the load sensors, the height of the material in the storage container may be defined as a function of the location of the center of gravity and used at step 620 to determine the height of the material (H2) at the time t2.

Next, at step 622, it is determined whether the height of the material in the container (H1) at the time t1 was equal to zero. If so, then at step 624 the height of the material in the container (H2) at time t2 is designated as the height of the material in the container (H1) at time t1, time t2 is designated as time t1 and the process returns to step 604 where it is repeated until the height of the material in the container (H1) at time t1 is no longer zero. Once the height of the material in the container at time t1 is no longer zero, the process continues to step 626 where the change in height is determined using the following equation:

$$D_H = H_1 - H_2$$ [Equation 17]

Next, at step 628, the change in the volume ($D_V$) of the material in the container is determined using the change in height ($D_H$). Specifically, the change in the volume of the material in the container may be determined using the change in the height ($D_H$) of the material in the container and the horizontal cross-sectional area of the container. Once the change in volume of the material in the container ($D_V$) is determined, the rate of change of volume may be obtained at step 630 using the following equation:

$$DV/DT = \frac{Dv}{t2 - t1}$$ [Equation 18]

Next, at step 632 it is determined whether the density of the material in the container is known. If the density of the material in the container is known, the process continues to step 636. If not, then the density is determined at step 634. Specifically, the density (D) may be determined using the change in mass (DM) and the change in volume ($D_V$) in the following equation:

$$D = \frac{DM}{Dv}$$ [Equation 19]

Once the density of the material in the container is obtained in step 634, the total volume of the material in the container ($V_2$) at time t2 may be determined by dividing the mass of the material in the container ($M_{filled2}$) at time t2 by the material density. Next, at step 638, the actual tank fill level is determined from the mass to replace the assumed level that was found at step 620. Finally, at step 640, the center of gravity for the empty container CGc is calculated. In one exemplary embodiment, the center of gravity for the empty container may be calculated using Equation 12. Once the parameters for the time t2 are determined, t2 is designated as t1, and $M_{filled2}$, $V_2$, and $H_2$ are designated as $M_{filled1}$, $V_1$, and $H_1$, respectively, at step 642. The process then can return to step 604 and be repeated with t2 now being t1 and a new point in time designated as t2, or since the tank position can now be identified, the full volume technique may be utilized.

As would be appreciated by those of ordinary skill in the art, with the benefit of this disclosure, the system and method disclosed herein may be used in conjunction with a storage container of any shape or geometry that produces or may be positioned to produce a horizontal shift in the center of the gravity of the materials contained therein with changes in material level. The storage containers used may have a variety of different slopes and shapes. For instance, the storage container may be a right angle triangle (e.g., some hoppers), a rectangular container with an open spout such as a pitcher or kettle shape or a parallelogram as shown in FIG. 1.

Moreover, as would be appreciated by those of ordinary skill in the art, with the benefit of this disclosure, as depicted in FIG. 3, the systems and methods disclosed herein may also be used in conjunction with any storage container whose center of gravity ordinarily does not shift horizontally with a change in the amount of materials contained therein. Specifically, such containers may be placed on a support structure and analyzed in accordance with the methods disclosed herein.

Although the present invention is described in conjunction with the use of load sensors, as would be apparent to those of ordinary skill in the art, with the benefit of this disclosure, the same methods may be carried out using other types of sensors that are operable to determine forces, moments, stress, strain or other associated parameters.

Moreover, as would be appreciated by those of ordinary skill in the art, with the benefit of this disclosure, the relationship of the force ratios or cg to fluid level for a particular container can be determined by filling the empty container with fluid of a known density while recording the outputs. This enables application of this method for containers of complex shapes without performing complete mathematical derivations. This technique is also beneficial for containers that typically deform in a consistent manner under load.

As would be appreciated by those of ordinary skill in the art, with the benefit of this disclosure, the force measurement disclosed herein may be used to monitor the density of the material in a storage container in real-time enabling an operator to analyze and control the quality of the material in the storage container. Additionally, the system and methods disclosed herein allow the monitoring of materials in a storage container without the need for the operator to come in contact with the material, which may be helpful when used in conjunction with hazardous materials.

As would be appreciated by those of ordinary skill in the art, the system and methods disclosed herein may be used to monitor any homogenous material such as, for example, sand, fluids used in oil field operations, and chemicals used in pharmaceuticals. Moreover, as would be apparent to those of ordinary skill in the art, with the benefit of this disclosure, the system and methods disclosed herein are scalable and may be used for a number of applications ranging from small scale laboratory applications to large scale production or industrial applications with various known load sensors.

As would be appreciated by those of ordinary skill in the art, with the benefit of this disclosure, the methods described herein could also be applied to a container, either an integral unit or a set of modules.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method of monitoring materials in a container comprising the steps of:
    placing the container in a desired position, wherein the container rests in the desired position;
    wherein when the container is placed in the desired position, a change in level of materials in the container changes position of center of gravity of the materials in the container along the horizontal axis;
    wherein the change in level of materials in the container corresponds to a change in volume of materials in the container;
    determining location of center of gravity of the materials in the container; and
    determining level of materials in the container;
    wherein the level of materials in the container is determined using position of the center of gravity of the materials in the container and container geometry.

2. The method of claim 1, further comprising determining volume of the materials in the container; wherein the volume of the materials in the container is determined using the level of materials in the container and container geometry.

3. The method of claim 2, further comprising determining density of the materials in the container, wherein determining the density of the materials in the container comprises: determining the mass of the materials in the container and dividing the mass of the materials in the container by the volume of the materials in the container.

4. The method of claim 3, further comprising determining the volumetric flow rate of the materials in the container, wherein the volumetric flow rate is determined using the density and rate of change of mass of the materials in the container.

5. A method of monitoring materials in a container comprising:
    placing the container at an angle to vertical;
    wherein the container rests on a first load sensor and a second load sensor;
    wherein the first load sensor and the second load sensor are separated by a predetermined distance;
    determining mass of the materials in the container using the readings of the first load sensor and the second load sensor;
    determining location of center of gravity of the container using a ratio of force at the first load sensor and force at the second load sensor;
    determining level of materials in the container using the location of the center of gravity and the angle of the container from vertical; and
    determining volume of materials in the container using the level of materials in the container and container geometry.

6. The method of claim 5, further comprising determining density of materials in the container by dividing the mass of the materials in the container by the volume of the materials in the container.

7. The method of claim 5, wherein the load sensor is selected from the group consisting of a hydraulic load cell, a scale, a load pin, a dual shear beam load cell, a strain gauge, an electronic load cell and a pressure transducer.

8. The method of claim 5, wherein the angle of the container from vertical is measured with an incline sensor.

9. A method of monitoring the amount of materials in a container comprising:
    placing the container on an angled platform,
    wherein the container rests on a first load sensor and a second load sensor;
    wherein the first load sensor and the second load sensor are separated by a predetermined distance;
    locating center of gravity of the container at a first point in time;
    changing the amount of materials in the container;
    locating center of gravity of the container at a second point in time;
    determining the change in the level of materials in the container between the first point in time and the second point in time; and
    determining the volume of materials removed from the container.

10. The method of claim 9, wherein the materials comprise a fluid used in oil field operations.

11. The method of claim 9, further comprising:
    determining a first mass of the materials in the container based on readings of the first load sensor and the second load sensor at the first point in time;
    determining a second mass of the materials in the container based on readings of the first load sensor and the second load sensor at the second point in time;
    determining a differential mass, wherein the differential mass comprises difference between the first mass and the second mass; and
    determining density of the materials in the container using the change in volume of the materials in the container and the differential mass of the materials in the container.

12. The method of claim 11, further comprising determining the total volume of the materials in the container at the second point in time using the density of the materials in the container and the second mass of the materials in the container.

13. The method of claim 12, further comprising determining the mass flow rate of the materials in the container.

14. The method of claim 13, wherein determining the mass flow rate of the materials in the container comprises dividing the differential mass of the materials in the container by a change in time; wherein the change in time represents the difference between the first point in time and the second point in time.

15. The method of claim 14, further comprising determining the volumetric flow rate of the materials in the container.

16. The method of claim 15, wherein determining the volumetric flow rate of the materials in the container comprises dividing the mass flow rate of the materials in the container by the density of the materials in the container.

17. A system for monitoring material storage comprising:
a container, wherein the container rests in a desired position and stores a material;
wherein level of the material in the container is determined based on horizontal location of center of gravity;
wherein center of gravity of the container shifts horizontally with changes in the level of the material in the container;
wherein volume of the material stored in the container is determined based on the level of the material in the container; and
a plurality of load sensors coupled to the container;
wherein the plurality of load sensors are symmetrically arranged at a base of the container.

18. The system of claim 17, wherein the load sensors are load cells.

19. The system of claim 17, further comprising an information handling system coupled to one or more of the plurality of load sensors.

20. The system of claim 19, wherein the information handling system displays a real time reading of the one or more of the plurality of load sensors.

21. The system of claim 19, wherein the information handling system processes the readings of the load sensors to determine information selected from the group consisting of a mass of the material in the container, a volume of the material in the container and the density of the material in the container.

22. The system of claim 21, wherein the information handling system displays information selected from the group consisting of the mass of the material in the container, the volume of the material in the container and the density of the material in the container in real time.

23. The system of claim 17, wherein the container is placed at an angle from vertical.

24. The system of claim 23, further comprising an incline sensor for measuring the angle of the container from vertical.

* * * * *